US012782138B2

(12) United States Patent
Becheret

(10) Patent No.: US 12,782,138 B2
(45) Date of Patent: Nov. 3, 2026

(54) HYBRID NAVIGATION WITH DETECTION OF SPOOFING BY MONITORING DEVIATIONS

(71) Applicant: SAFRAN ELECTRONICS & DEFENSE, Paris (FR)

(72) Inventor: Yves Becheret, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 194 days.

(21) Appl. No.: 18/856,509

(22) PCT Filed: Apr. 11, 2023

(86) PCT No.: PCT/EP2023/059442
§ 371 (c)(1),
(2) Date: Oct. 11, 2024

(87) PCT Pub. No.: WO2023/198710
PCT Pub. Date: Oct. 19, 2023

(65) Prior Publication Data

US 2025/0271269 A1 Aug. 28, 2025

(30) Foreign Application Priority Data

Apr. 12, 2022 (FR) .................................... 2203339

(51) Int. Cl.
*G01C 21/16* (2006.01)
*G01S 19/21* (2010.01)
*G01S 19/49* (2010.01)

(52) U.S. Cl.
CPC .......... *G01C 21/165* (2013.01); *G01S 19/215* (2013.01); *G01S 19/49* (2013.01)

(58) Field of Classification Search
CPC ...... G01S 19/215; G01S 19/49; G01C 21/165
See application file for complete search history.

(56) References Cited

U.S. PATENT DOCUMENTS

2009/0254278 A1 10/2009 Wang
2019/0179031 A1 6/2019 Broumandan et al.
2022/0057526 A1* 2/2022 Keyzer ................ G01S 19/215

FOREIGN PATENT DOCUMENTS

CN 110161537 A * 8/2019 .......... G01S 19/215
CN 110879404 A * 3/2020 .......... G01S 19/215
(Continued)

OTHER PUBLICATIONS

D.A.B. Fogg et al., A Generic Inertial Navigation System Model for Computer Simulation Studies, Technical Memorandum WRSL-TM-30/90, Department of Defence, Defence Science and Technology Organisation (Year: 1990).*
(Continued)

*Primary Examiner* — Bernarr E Gregory
*Assistant Examiner* — Fred H Mull
(74) *Attorney, Agent, or Firm* — MUNCY, GEISSLER, OLDS & LOWE, P.C.

(57) ABSTRACT

A navigation method includes continuously computing an inertial location and, at successive current times, obtaining a satellite location in order to compute a hybridised location by hybridising the inertial location and the satellite location. The method further includes: computing an instantaneous deviation at a given time and then a deviation that has been sustained from the computation time of said instantaneous deviation up to the current time in order to have, for a given period of time, a plurality of sustained deviations from different computation times up to the same current time; computing, for each sustained deviation, at least one detection indicator; comparing said detection indicator with a threshold in order to detect a deficiency of the hybridised location at the current time.

10 Claims, 3 Drawing Sheets

(56) References Cited

FOREIGN PATENT DOCUMENTS

| | | | | | |
|---|---|---|---|---|---|
| CN | 111443363 A | * | 7/2020 | ........... | G01S 19/215 |
| CN | 112902967 A | * | 6/2021 | ........... | G01S 19/215 |
| EP | 3 958 019 A1 | | 2/2022 | | |
| WO | WO-2021/032749 A1 | | 2/2021 | | |

OTHER PUBLICATIONS

N. Gu et al., GNSS Spoofing Detection Based on Coupled Visual/Inertial/GNSS Navigation System, Sensors 2021, 21, 6769. https://doi.org/10.3390/s21206769, 22 pages (Year: 2021).*
Yang, Liu et al., "Impact Assessment of GNSS Spoofing Attacks on INS/GNSS Integrated Navigation System," SENSORS, May 4, 2018, 20 pages, vol. 18, Issue No. 5, 1433 (XP 055676034).

* cited by examiner

HYBRID NAVIGATION WITH DETECTION OF SPOOFING BY MONITORING DEVIATIONS

The present invention relates to the field of navigation, and more particularly to hybrid inertial satellite navigation.

BACKGROUND OF THE INVENTION

Inertial navigation systems, comprising an inertial measurement unit connected to an electronic navigation computation unit by a data link, are known.

The inertial measurement unit comprises accelerometers and angular sensors arranged along the axes of a measurement reference frame for providing primary signals that are representative of the integral, over a time step, of the specific force vector with respect to an inertial reference frame. The successive signals are thus representative of the integral of the specific force vector from a time $t_0$ to a time $t_1$, then from the time $t_1$ to a time $t_2$, then from the time $t_2$ to a time $t_3$, etc. The signals are therefore generally called increments. The specific force ("g-force" or "mass-specific force") is on the one hand a representation of the sum of the acceleration of the carrier (for example a vehicle) of the inertial measurement unit relative to the inertial reference frame, and on the other hand of the Earth's gravity.

The electronic navigation computation unit comprises a processor and a memory containing navigation software that is executed by the processor and that uses the signals provided by the inertial measurement unit to determine inertial location data of the vehicle carrying the navigation system, these data including the position, velocity and attitude of the vehicle as computed from the signals coming from the inertial measurement unit.

It is known that the inertial location data contain errors related in particular to the inertial sensors, e.g. drift errors, biases and scale factor errors. These errors therefore affect the navigation accuracy.

To improve navigation accuracy, it has been proposed to use more expensive inertial sensors and to optimise how the signals are processed electronically.

It is also known to use external location data, for example from a satellite navigation system ("GNSS" systems such as the GPS, GALILEO, GLONASS, BEIDOU systems, etc.), in order to periodically adjust the inertial navigation. The navigation is then described as hybridised or hybrid.

It should be noted that satellite position finding or location finding involves receiving signals transmitted by satellites whose position is known and deducing from the length of time (or flight time) between the transmission and the receipt of each of the signals a measurement referred to as the "pseudorange" between the satellite signal receiver and each of the satellites whose signal has been received (each signal including a satellite ID and the signal transmission time). Thus, it suffices to have signals from four satellites in order to obtain the latitude, longitude and altitude of the receiver, which form satellite location data, together with an error relating to the measured lengths of time, the accuracy of the location finding however increasing with a greater number of satellites whose signals have been taken into account by the receiver in order to compute its position.

Hybrid navigation systems merge the inertial location data coming from the central inertial navigation unit with the satellite location data coming from the satellite signal receiver. These navigation systems include one or more Kalman filters arranged such that the hybrid navigation is adjusted to the satellite location data.

However, in parallel with the development of satellite signal receivers, deception (or spoofing) devices have appeared in order to deceive (or spoof) these satellite signal receivers. Such devices comprise an electronic processing unit connected to a radiofrequency signal transmitter for transmitting fraudulent signals having the features of the satellite signals. More specifically, the electronic processing unit is arranged to develop, from an actual initial position of a satellite signal receiver, fraudulent signals which, when they are picked up by the satellite signal receiver, lead to the satellite signal receiver computing an erroneous position. By way of example, the actual initial position of the satellite signal receiver may be detected by means of a laser rangefinder system or it may be communicated by the vehicle carrying the satellite signal receiver through the transmission of location signals in accordance with certain navigation rules, in particular for use in the air and at sea (ADS-B or AIS signals transmitted by vehicles to communicate their position to their neighbours). So that the fraudulent signals are considered by a satellite signal receiver, it does not suffice to emit the fraudulent signals with a power greater than the power of the original satellite signals. It is also necessary for the fraudulent signals to have the same code phase and a Doppler effect lying in the same range as the satellite signals that were previously being received by the satellite signal receiver. If the first received fraudulent signal is consistent with the latest position computed by the satellite signal receiver and with the previously received satellite signals, and if the fraudulent signals that are received subsequently are consistent with one another, then the fraudulent signals will be used by the satellite signal receiver as if they were true satellite signals and the error relating to the actual position of the satellite signal receiver will go undetected.

The Kalman filter in the hybrid navigation systems is protected by an innovation test to detect and reject the outliers. However, if the fraudulent signals have sufficient consistency, they may pass this innovation test, in which case it is then possible to cause the hybrid navigation to adjust to the spoofing positions. Thus, the satellite position data which normally make it possible to compensate for the errors in the inertial position data in the long term are impacted by the fraudulent signals and become a navigation error source.

Object of the Invention

The object of the invention is in particular to detect a spoofing operation and, once the spoofing operation has been detected, to provide non-spoofed navigation.

SUMMARY OF THE INVENTION

To this end, according to the invention, a navigation method provided, comprising continuously computing an inertial location and, at successive current times, obtaining a satellite location in order to compute a hybridised location by hybridising the inertial location and the satellite location, characterised in that the method comprises:

- computing at least one instantaneous deviation between the inertial location and the hybridised location at each current time;
- computing, from each instantaneous deviation, a deviation that has been sustained from the computation time of said instantaneous deviation up to the current time, by integrating a statistical location error indicator using a location error evolution model and storing the sustained deviation so as to have, for a given period of time, a plurality of sustained deviations and sustained statistical error indicators from different computation times up to the same current time;

computing, for each sustained deviation, at least one detection indicator comprising a ratio between:

- a difference between the instantaneous deviation and the sustained deviation, and
- a value based on the sustained statistical error indicator and a statistical hybridised location error indicator at the current time;

comparing said detection indicator with a threshold in order to detect a deficiency of the hybridised location at the current time.

Thus, the spoofing is detected by verifying that the difference between the instantaneous deviation between the operational hybrid navigation and the inertial navigation at the current time, on the one hand, and each of the sustained deviations, on the other hand, is consistent with the errors specific to the inertial navigation. As there are several deviations that have been sustained since different times, it is possible to perform a time analysis on the deviations, which allows both rapid spoofing operations and slow spoofing operations to be detected. It should also be noted that, with the invention, it is not necessary to compute a plurality of inertial navigations starting from different times; it is merely necessary to sustain the deviations of these navigations with respect to the hybrid navigation, which requires simpler computations that are significantly less resource-intense.

Other features and advantages of the invention become clear on reading the following description of a particular and non-limiting embodiment of the invention.

BRIEF DESCRIPTION OF THE DRAWINGS

Reference is made to the accompanying drawings, among which.

DETAILED DESCRIPTION OF THE INVENTION

Figure 1:
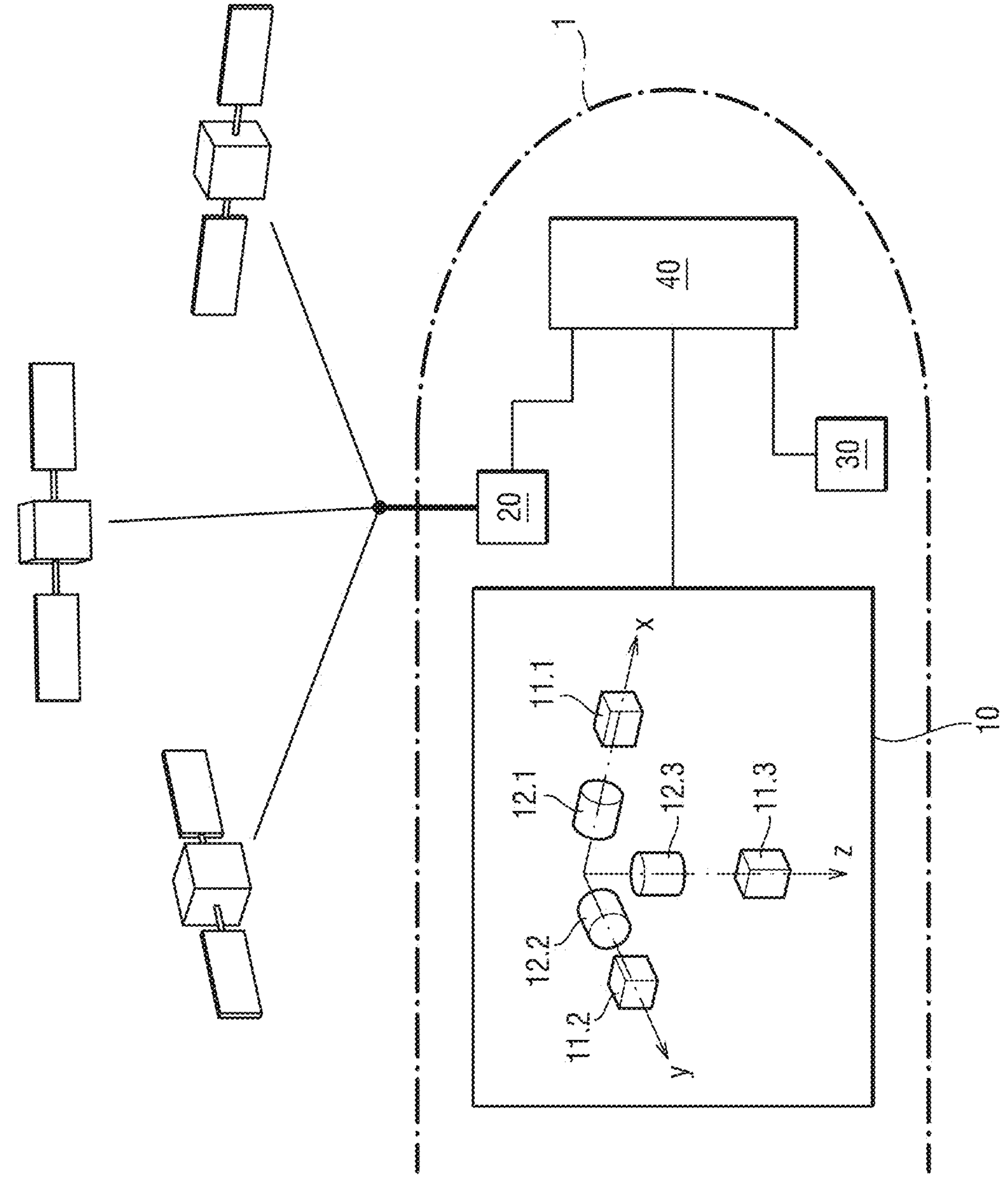
FIG. 1 is a diagrammatic view of part of an aircraft equipped with a navigation device carrying out the method of the invention.

With reference to the drawings, the invention is described here in an aviation application, in relation to a navigation device on board an aeroplane 1.

The navigation device comprises an inertial measurement unit 10, a satellite position signal receiving unit 20 and a baro-altimetric measurement unit 30, all three of which are connected to an electronic navigation computation unit 40.

Figure 2:
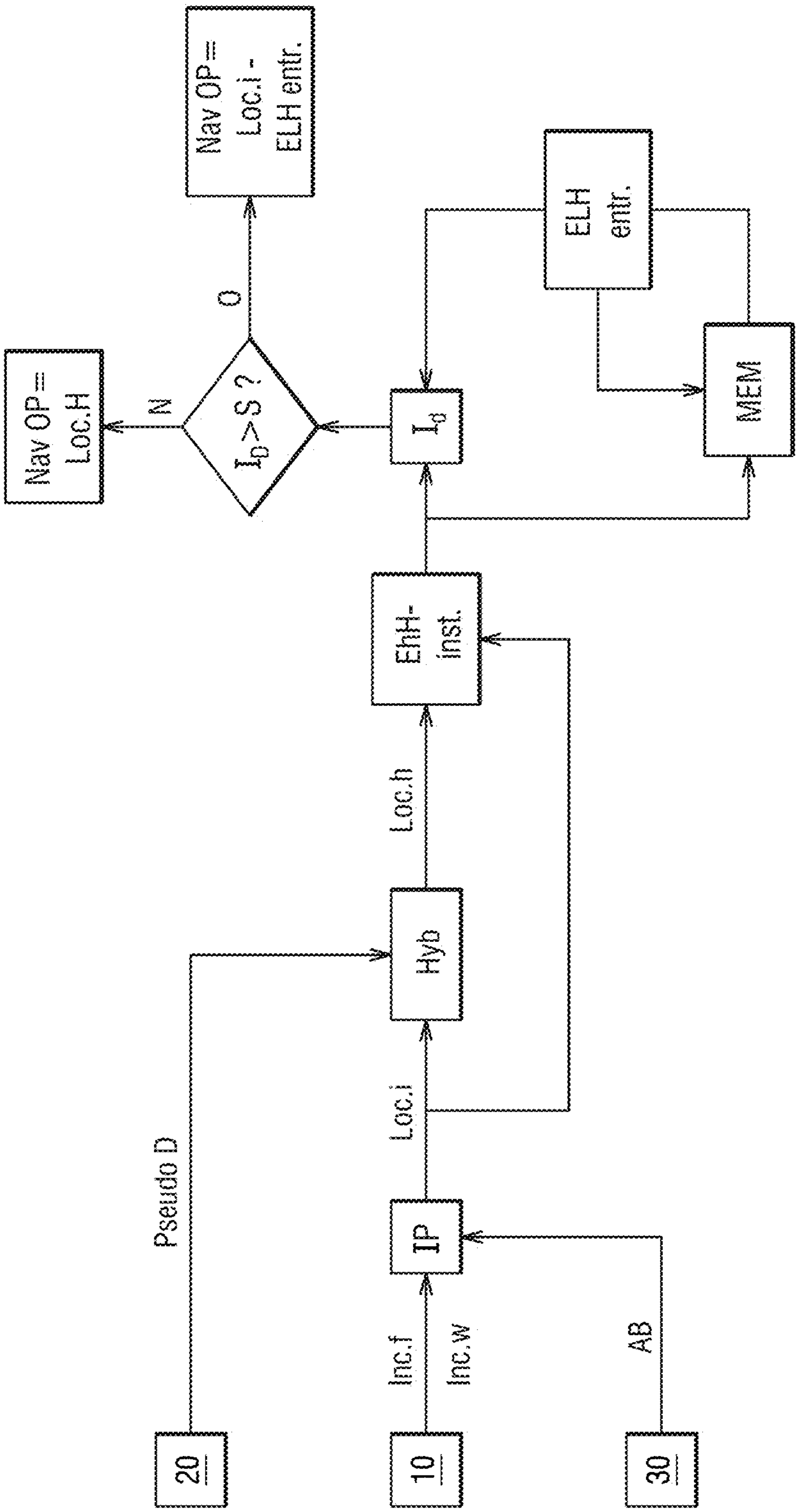
FIG. 2 is a flowchart illustrating the method of the invention.

The inertial measurement unit 10 comprises inertial sensors, namely linear inertial sensors (more specifically accelerometers 11.1, 11.2, 11.3) arranged along the axes x, y, z of a measurement reference frame m for measuring the "gravitational velocity" of this reference frame (i.e. the time integral of the specific force present at the centre of this reference frame) and angular inertial sensors, in this case rate gyros 12.1, 12.2, 12.3, arranged along the axes x, y, z of this reference frame for measuring the rotation of the measurement reference frame m with respect to an inertial reference frame i (not shown). The inertial sensors do not provide absolute values but rather increments representative of a variation in the magnitude measured with respect to the previous measurement. The inertial reference frame is, for example, the reference frame m when the inertial measurement unit 10 is live, or any other inertial reference frame angularly offset from said reference frame. The increments of the integral of the specific force (denoted as Incr.fs in FIG. 2) are thus representative of a variation in the components of the gravitational velocity along the three axes of the reference frame. The rotation thus increments (denoted as Incr.ω in FIG. 2) are representative of the variation over time in the integral of the angular rotation velocity of the measurement reference frame m with respect to the inertial reference frame and are provided in the form of quaternions, Euler angles, rotation matrices or Bortz vectors. The inertial measurement unit 10 thus provides the electronic processing unit 40 with inertial position signals containing first data representative of a gravitational velocity variation (accelerometric measurement) and second data representative of an angle variation (gyroscopic measurement). An inertial measurement unit of this kind is known per se and is not described in greater detail herein.

The satellite position signal receiving unit 20 comprises an electronic circuit and an antenna for receiving and decoding satellite position signals coming from satellites belonging to a satellite constellation in orbit around the Earth, such as the constellations of the GPS, GALILEO, GLONASS, BEIDOU, etc. satellite positioning systems. The electronic circuit is arranged to compute pseudoranges (PseudoD in FIG. 2) between the satellite position signal receiving unit 20 and each satellite whose signal has been received at a time t, and to provide the electronic processing unit 40 with a satellite location which, in this case, comprises a set of pseudoranges at the time t. Alternatively, the satellite position signal receiving unit 20 may be arranged to compute a satellite position of the aircraft 1 from the pseudoranges and to provide this satellite position as a satellite location. A satellite position signal receiving unit of this kind is known per se and is not described in greater detail herein.

The baro-altimetric unit 30 is arranged to provide a signal AB (see FIG. 2) representative of the altitude of the aircraft 1 as a function of the atmospheric pressure surrounding it. A baro-altimetric unit of this kind is known per se and is not described in greater detail herein.

The electronic processing unit 40 comprises an electronic circuit having inputs that are connected to the outputs of the inertial measurement unit 10, of the satellite position signal receiving unit 20 and of the baro-altimetric unit 30, for example by electrical conductors. In this case, the electronic processing circuit comprises at least one processor and a memory containing software which can be executed by the processor and which comprises instructions arranged to carry out the method of the invention.

More specifically, the electronic processing unit 40 implements a pure inertial navigation algorithm (IP in FIG. 2) arranged to use the signals coming from the inertial measurement unit 10 in order to compute an inertial location Loc.i of the aircraft 1, said location comprising:

- a position (latitude, longitude and altitude),
- a velocity (or the vertical velocity and two components of horizontal rotation around the Earth),
- an attitude (roll angles, pitch, yaw).

The baro-altimetric information AB is used to loop the altitude so as to have a more precisely determined altitude and a non-divergent vertical velocity with limited error, and to take into account the apparent curvature of the terrestrial ellipse which depends on the altitude.

The electronic processing unit 40 also implements a hybridised navigation algorithm (Hyb in FIG. 2) to compute, in a manner known per se, a hybrid location Loc.h from the pseudoranges PseudoD and the inertial location Loc.i. The hybridisation roughly involves adjusting the pure inertial navigation to a satellite position of the aircraft determined from the pseudoranges PseudoD. The hybridisation methods are known per se and use Kalman filters, for example; they will not be explained in more detail here.

The method of the invention thus comprises, in conventional manner, continuously computing an inertial location and, at a current time, obtaining satellite location data in order to compute a hybridised location by hybridising the inertial location and the satellite location. The hybridised location—normally more accurate than the pure inertial location—is used for the operational navigation of the vehicle in the absence of any spoofing operation. It should be noted that the current time is preceded in time by other current times that have since become past times.

However, the object of the method of the invention is also to:

- determine whether an operation to spoof the satellite position signal receiving unit 20 which may affect the actual accuracy of the hybridised inertial location compared with the self-assessed accuracy of said hybridised inertial location is in progress,
- where applicable, provide emergency navigation not affected by the spoofing.

Horizontal spoofing, which is the most difficult to detect, is of interest in this case (the vertical error induced by a vertical spoof can be detected more easily from the barometric altitude AB). The location data of interest are therefore the horizontal location data, namely the position data along the two horizontal axes, and the velocity data along said two axes.

The method comprises the steps of:

- computing at least one instantaneous deviation ELH_inst between the pure inertial horizontal location at the current time and the hybridised horizontal location at the current time;
- then computing, from the instantaneous deviation ELH_inst, a deviation ELH_entr that has been sustained from the computation time of said instantaneous deviation up to the current time by integrating a statistical inertial location error indicator, and storing the sustained deviation ELH_entr in a memory (denoted MEM in FIG. 2) in order to have, for a given period of time, a plurality of sustained deviations and sustained statistical indicators, up to the current time, from different computation times (more specifically, from current computation initialisation times that have since become past computation initialisation times);
- computing, from these deviations and the statistical error indicators, a detection indicator Id that will be compared with a threshold S to detect a deficiency of the hybridised location;
- providing, in the event that the threshold is exceeded, emergency navigation for reinitialising the hybridised navigation more precisely than the pure inertial location.

Therefore, deviations are computed between the pure inertial navigation that has been sustained from a time $t_r$, and the pure inertial navigation initialised by the "coasting" inertial hybrid navigation from $t_r$. For each of these deviations, the statistical error indicator is in this case the error covariance of the current hybridised horizontal location and the error covariance of the coasting inertial horizontal location from $t_r$. This covariance is initialised according to the covariance of the hybridised location error at the initialisation time $t_r$ and is then sustained by means of a linearised error model in the form of a horizontal location error evolution matrix and possibly IMU error parameters and random noise levels in the evolution model.

It should be noted that with the method of the invention, a plurality of deviations between the initiated pure inertial navigation and the hybridised navigation from different predetermined times (and therefore from different satellite locations) are available.

Note:

- $t_i$ (i varying from 1 to N+1, t1 being the oldest time and $t_{N+1}$ being the current time) denotes the date, in terms of navigation time, of the sampling time of the horizontal location data used for computing and sustaining deviations;
- $\Delta t$ denotes the time step, which is either equal to or an integer multiple of the adjustment rate of the hybridised navigation filter, equal to four seconds in this case;
- $ELH(t_i, t_{N+1})$ denotes the sustained deviation, from $t_i$ to $t_{N+1}$, between the inertial horizontal location and the hybridised horizontal location;
- $ELH(t_{N+1}, t_{N+1})$ denotes the instantaneous deviation between the inertial horizontal location and the hybridised horizontal location at $t_{N+1}$.
- It should be noted that the hybridised horizontal location at the current time $t_{N+1}$ has benefited from successive adjustments to the satellite locations while the inertial horizontal location initiated from the time $t_i$ has not.

In the absence of any spoofing of the hybridised navigation, and disregarding the effect of the errors in the inertial measurement unit at the input of the pure inertial navigation, the evolution of the error in the pure inertial navigation is, in the absence of any manoeuvre, perfectly deterministic at $t_{N+1}$ if the following are known:

- at $t_i$, the exact horizontal position error values, the exact values for the terrestrial rotation projection error (analytical platform position p with respect to the terrestrial reference frame), the exact values for the horizontal velocity around the Earth and the exact attitude values (analytical platform position p with respect to the measurement reference frame m of the inertial sensors of the IMU);
- the approximate values of the current latitudes and altitudes between $t_1$ and $t_{N+1}$.

The aim is therefore to verify that the difference between the instantaneous deviation $ELH(t_{N+1}, t_{N+1})$ and the sustained deviation $ELH(t_i, t_{N+1})$ at the current time $t_{N+1}$ is as expected.

To obtain the deviation $ELH(t_i, t_{N+1})$, the inertial location variance is integrated from the predetermined time $t_i$ up to the current time $t_{N+1}$ by using an inertial horizontal location error evolution model. The inertial horizontal location error evolution model is known per se. It is typically an F-matrix comprising seven error states:

- two error states relating to the angular position,
- two error states relating to the angular velocity of the displacement movement around the Earth (or two horizontal velocity error states),
- three attitude error states.

More specifically here, the error evolution model used is the exponential of $F*\Delta t$, namely a linearised matrix of the horizontal inertial navigation error model at the average position and velocity over the time step $\Delta t$. By taking into account the position and the average duration over Δt in F, it is possible to improve the accuracy of the deviation computation algorithm.

This model can be supplemented, in an approximate manner, to improve the accuracy of the error evolution model during the acceleration, deceleration or turning phases, by taking into account the effect of the azimuth error as follows:

- the acceleration input in the stabilised reference frame of the analytical platform p, a constant, is approximated by the variation in inertial horizontal velocity (over Δt) to the velocity error;
- a correction factor of the above approximation (ratio of the constant acceleration over Δt to the horizontal position error) is used, which is equal to the product of the azimuth error and the ratio of the deviation between the horizontal position variation (over Δt) and the horizontal position error.

In simpler terms, it is possible to compute a propagation of the seven states and of a desensitisation noise (random walk of velocity/attitude/position).

Models that can be used to carry out the invention are described in the document "A Generic Inertial Navigation System Model for Computer Simulation Studies", D. A. B. Fogg and R. T. Janus, Technical Memorandum WRSL-TM-30/90, Department of Defence, Defence Science and Technology Organisation, September 1990.

It should be borne in mind that the location data of interest here are the position data along the two horizontal axes and the velocity data along said two axes; therefore, a position deviation ELH($t_i$, $t_{N+1}$) for each of the two axes is computed along with a velocity deviation ELH($t_i$, $t_{N+1}$) for each of the two axes.

A detection indicator Id is computed for each ELH($t_i$, $t_{N+1}$) deviation. Although only one detection indicator is mentioned here for the sake of simplicity, there is a detection indicator for the position and a detection indicator for the velocity, which are computed in the same way.

The detection indicator Id is a ratio. The numerator is equal to the square of the difference between the instantaneous deviation ELH($t_{N+1}$, $t_{N+1}$) and the sustained deviation ELH($t_i$, $t_{N+1}$). The denominator is the sum of:

- the horizontal location variance resulting from the propagation of the horizontal location error evolution model of the covariances of the hybridised horizontal location error and the inertial horizontal location at $t_i$;
- the hybridised horizontal location error variance at $t_{N+1}$.

Each detection indicator Id is then compared with a threshold S set as a function of the desired probability of false detection. The threshold is set at 3.5 in this case, which allows for a probability of false detection of less than $10^{-3}$ here.

If the detection indicator Id is below the threshold, the deviations are consistent, and so there is a priori no spoofing. The hybrid horizontal location continues to be used for the operational navigation.

Otherwise, spoofing is considered to be in progress and an alert is issued.

As several deviations sustained from different times have been stored in the memory, it is possible to carry out an analysis over the entire given period, which makes it possible to detect rapid spoofing, which causes an abrupt drift of the hybrid horizontal location, on the basis of merely the most recent deviations, and to detect slow spoofing, which causes a very gradual drift of the operational hybrid horizontal location, on the basis of the oldest deviations.

Therefore, the detection of slow spoofing is all the more effective when old data are available. However, it is necessary to limit the quantity N of data in the memory so as to limit the size of the memory and the number of computations to be carried out.

If a simple sliding time window is used to manage the content of the memory (at each predetermined time, the oldest piece of data is erased and the latest computed piece of data is stored), the time depth will be very limited.

It is therefore preferable to use an algorithm for selecting the stored data such that, after a certain time, the group of stored data contains, for the given period, a first series of recently stored sustained deviations and various series of sustained deviations separated from the first series by multiples of the time step.

More specifically, the algorithm aims to keep the following in the group:

- a first series of n sustained deviations, recently stored and separated from one another by one time step,
- a second series of n sustained deviations separated from the first series by twice the time step, the sustained deviations of the second series being separated from one another by two time steps,
- a third series of n sustained deviations separated from the second series by four times the time step, the sustained deviations of the third series being separated from one another by four time steps,
- a fourth series of n sustained deviations separated from the third series by eight times the time step, the sustained deviations of the fourth series being separated from one another by eight time steps,
- a fifth series of n sustained deviations separated from the fourth series by sixteen times the time step, the sustained deviations of the fifth series being separated from one another by sixteen time steps,
- a sixth series of n sustained deviations separated from the fifth series by thirty-two times the time step, the sustained deviations of the sixth series being separated from one another by thirty-two time steps.

Figure 3:
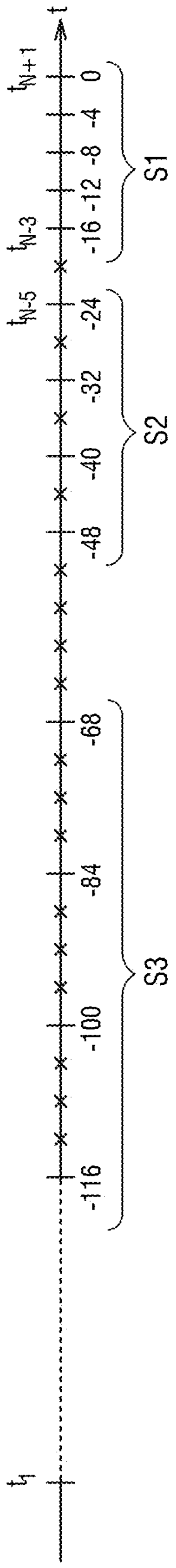
FIG. 3 is a timing diagram illustrating the state of the memory of said navigation device at a given time.

In this case, the number n is equal to four. FIG. 3 shows the first three series:

- the first series S1 comprises the deviations sustained from the times −4, −8, −12, −16 (i.e. the current time minus one time step, the current time minus two time steps, the current time minus three time steps, the current time minus four time steps);
- the deviation sustained from the predetermined time −20 has been removed;
- the second series S2 comprises the deviations sustained from the times −24, −32, −40, −48;
- the deviations sustained from the times −52, −56, −60, −64 have been removed;
- the third series S3 comprises the data of the predetermined times −68, −84, −100, 116;
- and so on for the other series.

This can also be represented in another way, in this example with the number n equal to 4:

- a value tj is selected every four values to be propagated for $t_{N+1}-t_i$ beyond 4*Δt (i.e. 16 s if Δt is 4 s);
- out of these values propagated for $t_{N+1}-t_i$ beyond 4*Δt, one value is selected every four values to be propagated for $t_{N+1}-t_i$ beyond 16*Δt (i.e. 64 s if Δt is 4 s);
- out of these values propagated for $t_{N+1}-t_i$ beyond 16*Δt, one value is selected every four values to be propagated for $t_{N+1}-t_i$ beyond 64*Δt (i.e. 256 s if Δt is 4 s);

out of these values propagated for $t_{N+1}-t_i$ beyond 64*Δt, one value is selected every four values to be propagated for $t_{N+1}-t_i$ beyond 256*Δt (i.e. 1024 s if Δt is 4 s);

etc., and finally, no value is propagated beyond a maximum value of $t_{N+1}-t_i$.

This memory management method allows for a much greater time depth than a sliding window for the same quantity of data. Thus, with about 40 sustained deviations stored, the time depth is about 1 hour.

It should be noted that, in this description, the deviation computation times have been disregarded.

In the event of spoofing, having detection indicators corresponding to different past start times for the ELH deviation computation also means that it is possible to determine a spoofing start time (the oldest time for which the indicator Id is greater than the threshold).

It is therefore possible to compute a new operational navigation by correcting the pure inertial navigation at the current time by using the most recent sustained deviation prior to the start of the spoofing and to propose it to the pilot of the vehicle.

One way of performing the computations used to implement the invention is detailed below.

To sustain the deviations, sampling is carried out over time intervals (typically 30 seconds to 2 minutes) and the following are propagated over said time intervals:

N' $ELH(t_i, t_N)$ error state sets of the horizontal pure inertial location (which is assumed to be correct), N' associated $P(ELH(t_i, t_N))$ error covariance matrices. At each sampling time step $\delta t = t_{N+1} - t_N$, the following are carried out:

computing, one time, the matrix $\Phi(loc.i(t_N), loc.i(t_{N+1}), \delta t)$, which is exponential over the time interval δt of the average inertial horizontal location error matrix from $t_N$ to $t_{N+1}$ F (t) (the vertical route being stabilised by means of the barometric altitude) which can be estimated as a constant over the time interval excluding accelerations (i.e. the specific force from which the apparent gravity is subtracted);

computing at $t_{N+1}$ the value of the error vector $ELH(t_{N+1}, t_{N+1})$ of the pure inertial horizontal location (looped with the barometric altitude) compared with the hybridised location at the same time $t_{N+1}$;

sampling, at the same time, the (all-encompassing) $P_1(t_{N+1})$ covariance of the hybridised location errors at that time;

computing, N'−1 times, the evolution of the error states $X_j$ over the time step δt by using the formula $X_j(t_{N+1}) = \Phi X_j(t_N) + \Phi B * \Delta V$, where ΔV is the average horizontal velocity variation over δt in the reference frame p of the inertial analysis platform. If the states defined in ELH are velocity errors, B is the 7×2 matrix, which is equal to 0 for all its components except for the two components corresponding to the two rows of the velocity error states in p and to the azimuth error column, which are +1/δt and −1/δt, respectively;

computing, N'−1 times, evolutions of the $P(ELH(t_i, t_N))$ error covariance matrices associated with the different values of $t_i$ available over the time step δt by using the formula $$P(ELH(t_i, t_{N+1})) = P(ELH(t_i, t_N) * \Phi * P(ELH(t_i, t_N))^t + C + Q * \delta t$$

where C is a corrective term corresponding to the azimuth error of the inertial location in the presence of an acceleration and Q corresponds to the sum of the pseudo-random evolution in the errors and a random walk in the angle and velocity of the inertial measurement unit (this formula is known per se). The determination of the matrix B is slightly different if the states defined in ELH are errors in rotational velocity around the terrestrial ellipsoid in p; account must be taken of the local ellipsoid curvature matrix in p (more precisely its median value between $t_N$ and $t_{N+1}$).

Generically, it is possible to compute, for each time step δt, an evolution matrix Φ' approximated precisely as a function of the median location (not only horizontal) and of the location difference between $t_N$ and $t_{N+1}$.

The formulae for computing the evolution from $t_N$ to $t_{N+1}$ are:

$$ELH(t_i, t_{N+1}))) = \Phi' * ELH(t_i, t_N)) \text{ and}$$

$$P(ELH(t_i, t_{N+1}) = P(ELH(t_i, t_N) * \Phi' * P(ELH(t_i, t_N) + Q * (t_{N+1} - t_N)$$

The computation of the evolution in the horizontal location deviation covariance can be refined by supplementing the horizontal location error states with IMU error states (e.g. biases and residual misalignments of the sensitive axes of the IMU inertial sensors) and by supplementing the evolution matrix (of dimension >7×7) accordingly.

Where there are very large potential altitude deviations between the pure inertial navigation and the hybrid navigation, another error term may also be taken into account for computing the evolution from $t_N$ to $t_{N+1}$ in the $P(ELH(t_i, t_N))$ covariances owing to the curvature deviation as a function of altitude. For a given horizontal velocity, an altitude deviation of 320 m leads to a horizontal position evolution deviation of about 0.0001 times said velocity ($2*320/R_T \cong 0.0001$, with the average radius of the Earth $R_T$ being ≅6,400,000 m). This therefore represents a potential position error evolution of 3 cm/s for an apparatus travelling at 300 m/s, which is generally small or equivalent to the effect of the hybrid navigation velocity errors and the modelled IMU errors.

Using the data on the location variation between $t_N$ and $t_{N+1}$ (essentially the horizontal velocity) in addition to the median location allows the location error variations from $t_N$ to $t_{N+1}$ to be computed more precisely.

The attitude values at $t_N$ and $t_{N+1}$ can be used to compute the evolution of the $ELH(t_i, t_N)$ error covariances from $t_N$ to $t_{N+1}$ if errors in the inertial measurement unit (e.g. accelerometric or gyrometric biases or sensor axis misalignments) are modelled in addition to the "ELH" inertial location errors to obtain a more accurate assessment of the error domains determined by the covariance matrices "P" as a function of time.

It is noted that at each "new ti" (sampling dates of the pure inertial location and of the hybridised location), all the sustained location deviation states $ELH(t_i, t_N)$ up to $t_N$ that are already available are propagated from $t_N$ to $t_{N+1}$ to obtain the $ELH(t_i, t_{N+1})$ values. The new set of $ELH(t_{N+1}, t_{N+1})$ location deviation states, i.e. the deviation states between the pure inertial location and the hybridised location at $t_{N+1}$, is also recovered, and the surplus $ELH(t_i, t_{N+1})$ state or states are optionally eliminated.

The values of the N' detection indicators are obtained using the formula:

$$Id(t_i) = (Loc.i(t_i) - H * ELH(t_i, t_{N+1}) - Loc.h(t_i))^2 / H * P(ELH(t_i, t_{N+1}) * H^t$$

for all available $t_i$ and $ELH(t_i, t_{N+1})$. $P(ELH(t_i, t_{N+1}))$ is the $ELH(t_i, t_{N+1})$ error matrix or error covariance matrix. H corresponds to the observations, namely a horizontal position error and, in the preferred embodiment described herein, a horizontal velocity error. It should be noted that $t_{N+1}-t_i$ is the Id $(t_i)$ detection delay.

It goes without saying that the invention is not limited to the described embodiment but rather encompasses any variant within the scope of the invention as defined by the claims.

In particular, the time step used for the storage in this case is that of the adjustments, but it may be different and correspond, for example, to a multiple of the adjustment time step.

The filtering of the stored data is optional or may be different. It is possible, for example, to use a conventional sliding time window to renew the group of stored data (the oldest piece of data is taken out the group each time a new piece of data is stored).

Although the hybridised navigation is computed on the basis of the pseudoranges, it is possible to compute the hybridised navigation from a pure satellite position obtained on the basis of the pseudoranges.

In a variant, the hybrid horizontal location variance can be used as a statistical error indicator. As long as satellite signals are received, the hybrid horizontal location variance is negligible by comparison with the inertial horizontal location variance. By contrast, using the covariance improves the performance of the method of the invention when the sets of satellite data are unavailable for at least one period of time of approximately a few minutes.

The invention can be carried out using only the position data along the two horizontal axes as horizontal location data. It should be noted, however, that accuracy can be improved by taking the velocity data along said two axes into account.

Locations may be provided in polar or Cartesian coordinates.

The invention claimed is:

1. A navigation method comprising continuously computing an inertial location and, at successive current times, obtaining a satellite location in order to compute a hybridised location by hybridising the inertial location and the satellite location, comprising:

computing at least one instantaneous deviation between the inertial location and the hybridised location at each current time;

computing, from each instantaneous deviation, a deviation that has been sustained from the computation time of said instantaneous deviation up to the current time, by integrating a statistical location error indicator using a location error evolution model and storing the sustained deviation so as to have, for a given period of time, a plurality of sustained deviations and sustained statistical error indicators from different computation times up to the same current time;

computing, for each sustained deviation, at least one detection indicator comprising a ratio between:

a difference between the instantaneous deviation and the sustained deviation, and a value based on the sustained statistical error indicator and a statistical hybridised location error indicator at the current time;

comparing said detection indicator with a threshold in order to detect a deficiency of the hybridised location at the current time.

2. The navigation method according to claim 1, wherein the statistical error indicator comprises the inertial location variance and wherein the detection indicator is equal to the square of the difference between the instantaneous deviation and the sustained deviation to the sum of the sustained inertial location variance and the hybrid location variance at the current time.

3. The navigation method according to claim 1, comprising, in the event that the threshold is exceeded, providing emergency navigation in which the hybridised location is replaced with a corrected inertial location using a deviation that has been sustained from a time prior to the detected deficiency.

4. The navigation method according to claim 1, wherein the inertial location uses horizontal location data that comprise position data.

5. The navigation method according to claim 4, the horizontal location data also comprise velocity data.

6. The navigation method according to claim 1, wherein the satellite location uses satellite location data that comprise pseudoranges.

7. The navigation method according to claim 1, wherein the locations are computed at a stabilised altitude and vertical velocity.

8. The navigation method according to claim 1, wherein deviations are stored in accordance with a predetermined time step.

9. The navigation method according to claim 8, wherein the deviations are filtered over time to retain in the group, for the given period, a first series of recently stored sustained deviations and various series of sustained deviations from the first series by multiples of the time step.

10. The navigation method according to claim 9, wherein the stored deviations are filtered over time to retain the following in the group, for the given period of time:

a first series of n sustained deviations, recently stored and separated from one another by one time step, a second series of n sustained deviations separated from the first series by twice the time step, the sustained deviations of the second series being separated from one another by two time steps, a third series of n sustained deviations separated from the first series by four times the time step, the sustained deviations of the third series being separated from one another by four time steps, a fourth series of n sustained deviations separated from the first series by eight times the time step, the sustained deviations of the fourth series being separated from one another by eight time steps, a fifth series of n sustained deviations separated from the first series by sixteen times the time step, the sustained deviations of the fifth series being separated from one another by sixteen time steps, a sixth series of n sustained deviations separated from the first series by thirty-two times the time step, the sustained deviations of the sixth series being separated from one another by thirty-two time steps.

* * * * *